Oct. 22, 1963   J. VAN SWINDEREN   3,107,720
GAS-FIRED RADIANT HEATERS
Original Filed Feb. 21, 1955   2 Sheets-Sheet 1
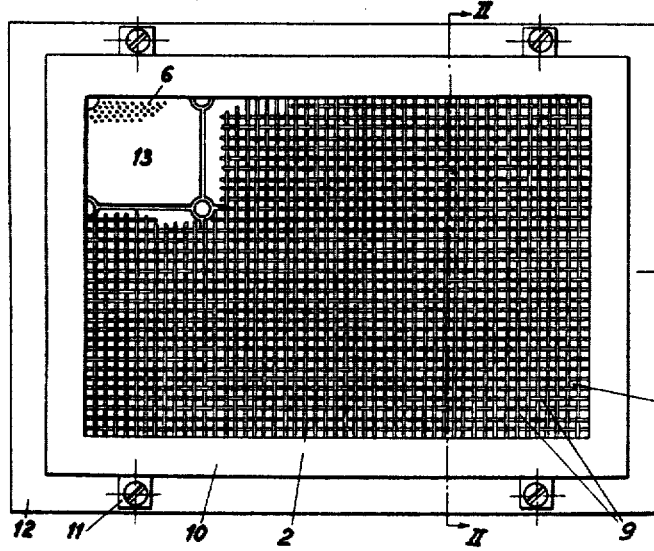
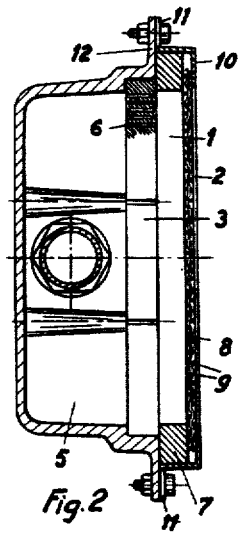
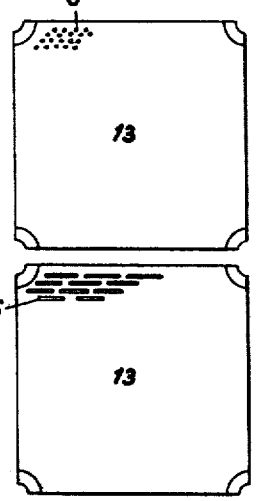
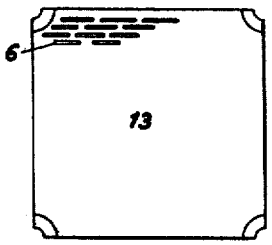
INVENTOR
JEAN VAN SWINDEREN
BY
ATTORNEY

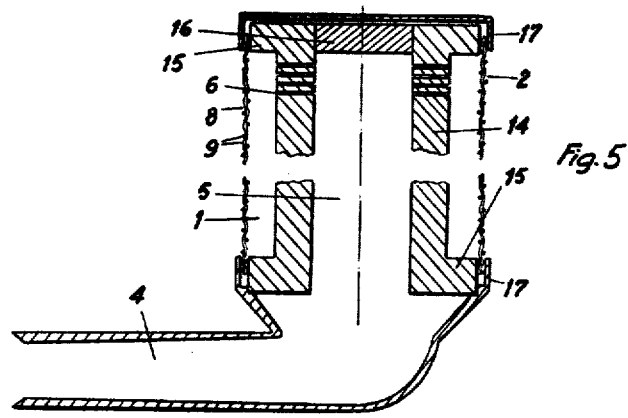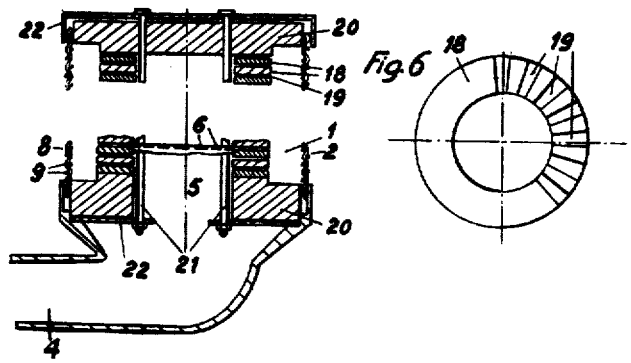

3,107,720
GAS-FIRED RADIANT HEATERS
Jean van Swinderen, Berchem-Sainte-Agathe, Belgium, assignor to Antargaz Societe Anonyme de Distribution de Gaz Liquides de Petrole
Original application Feb. 21, 1955, Ser. No. 489,686. Divided and this application Feb. 21, 1961, Ser. No. 90,711
Claims priority, application Belgium Feb. 24, 1954
9 Claims. (Cl. 158—116)

This invention relates to gas-fired radiant heating apparatus suitable for heating or drying purposes.

This application is a division of my co-pending application Serial No. 489,686, filed February 21, 1955, now abandoned.

It is a principal object of the invention to provide radiant heating apparatus giving a particularly advantageous output of heat radiation from a supply of gaseous fuel. Thus an extraordinarily large proportion of the B.t.u. value of the fuel is converted into radiant heat directly useful as such, with relatively little dissipation of the heat of combustion by conduction or by convection in the burner gases.

In apparatus according to the invention, a gas mixing or distributing chamber adapted to receive a flammable mixture of fuel gas and air is bounded by a ceramic wall made of a refractory ceramic material of low thermal conductivity, in which a great number of minute perforations or gas passages is provided for distribution of the gas mixture through said wall in many distinct fine streams to be burned at the outer side of said wall; and outside the perforated ceramic wall there is a burning chamber bounded at its inner side by the outer surface of that wall and bounded at its outer side by a relatively thin grid or screen of heat-resistant material.

The perforated wall separating the chambers is made of a ceramic material with low thermal conductivity and with sufficient thickness, in a manner known per se, so that upon the burning of the gas streams the ceramic wall blocks conductive dissipation of the flame heat reaching its outer surface and accumulates heat until through the resulting temperature rise at that surface the heat continuing to reach it is dissipated essentially by radiation. A manner of so making perforated ceramic plates for radiant gas burners is known, for example, from the McCourt British Patent No. 6,312 of 1915.

The grid or screen of heat-resistant material is positioned sufficiently close to the ceramic wall to be rendered incandescent by heat from the gas flames. It intercepts or obstructs much of the radiation from within the burning chamber, yet it is formed over its working area with openings which enable the escape of the burned gas and are sufficiently large that much of such radiation passes freely through its openings to the front of the burner. Upon becoming incandescent, the grid or screen radiates heat both outwardly from the burner and inwardly to the ceramic wall surface. Its temperature and inward radiation increases the temperature to which heat must accumulate on the ceramic wall in order to bring the heat outflow from the burner into equilibrium with the heat input from the flames, and thus it intensifies the outward radiation of the ceramic wall surface, so that the resulting intensified radiations through its openings and from its own structure provide an extraordinarily high and extraordinarily useful output of radiant heat from the burning of the fuel gas.

The perforated ceramic wall of low thermal conductivity and the incandescible grid thus work together to constitute a reverberatory heat accumulating burning chamber which increases the working temperature attained by each of its elements and in this way very considerably enhances the output of radiant heat from the gaseous fuel.

The perforated ceramic wall is made so thick and so low in thermal conductivity that the heat concentrated at its outer surface never brings its inner surface to a temperature high enough to cause ignition of the gaseous mixture in the distributing chamber. The gas passages extending through it are elongated by its thickness and are made so small in cross-sectional area that the speed of the gas streams flowing through the passages is greater than the propagation speed of the flames, so that flame will not back-flash through the gas passages into the distributing chamber. The grid or screen is formed with relatively large openings which permit the gas mixture to flow through them at a speed lower than the flame propagation speed, so that a flame formed by ignition of the gas mixture outside the grid or screen will back-flash through its openings when the screen reaches the ignition temperature of the gas, thus causing the burning to settle in the burning chamber.

In advantageous embodiments of the invention, the grid or screen is made of a refractory metal withstanding temperatures of at least 1100° C., for example, a nickel-chrome alloy, and with as little thickness as is consistent with its necessary resistance to the heat and other conditions of use of the apparatus. Preferably, its thickness is less than 3 mm., and the ratio of the area of its openings to the total screen area is at least equal to 0.5.

In a particular form of the apparatus, the burning chamber is bounded on its outer side by a substantially flat grid or screen and on the gas supply side by a refractory ceramic wall in the form of a relatively thick flat plate providing approximately the same working area as the screen and parallel thereto, said plate being provided with a great number of minute openings for the distribution of the gaseous mixture. A frame of refractory ceramic material surrounds the ceramic plate and projects beyond it with a height substantially equal to the depth of the burning chamber, and the grid or screen lies freely over said frame and is held on it by means cooperating with the refractory frame and comprising preferably a second frame surrounding the burning chamber.

In another advantageous form of the apparatus, the gaseous mixture is introduced into the burning chamber from a central distributing space bounded by a refractory ceramic wall which surrounds it and in which are provided the minute openings or gas passages, and the metal grid or screen in turn surrounds the ceramic wall.

In another form of the apparatus, the refractory ceramic wall is formed by stacking rings which are shaped so that the opposing surfaces of two adjacent rings leave between said rings the passages for the supply of the gaseous mixture into the burning chamber.

Other features of the invention will appear from the following description which further sets forth, as non-limitative examples, various embodiments of the invention. Reference is made to the accompanying drawings in which:

FIG. 1 is a front view, with part of the screen broken away, of a radiant heating apparatus according to the invention (at a scale of approximately half size);

FIG. 2 is a view in section taken along line II—II of FIG. 1 (with the screen thickness somewhat exaggerated);

FIG. 3 is a diagrammatic front view (in approximately full scale) of a ceramic wall element of the apparatus shown in FIGS. 1 and 2;

FIG. 4 is a view similar to FIG. 3 but relating to a modification;

FIG. 5 is a diagrammatic cross-sectional view, partly broken away, of another form of apparatus according to the invention; and FIG. 6 is a view similar to FIG. 5 but relating to another embodiment of apparatus of the general form shown in FIG. 6.

In the various figures, similar reference numerals pertain to similar elements.

In each of the forms shown in the drawings, the radiant heating apparatus comprises a radiating burning chamber 1 bounded at its outer side by an incandescible heat-resistant grid or screen 2 enabling the escape of the burned gases, and bounded internally by walls made of refractory ceramic material with low thermal conductivity. The principal one of said walls, as indicated at 3 in FIG. 2, forms a divider separating the burning chamber 1 from the gas distributing chamber 5 and is provided with a great number of minute openings or perforations 6. The openings 6 form elongated tubular gas passages extending through the ceramic wall 3 and distributed in a regular pattern over its working surface area.

The gas and air enter the apparatus through an air and combustible gas mixer 4 of known type. There is thus formed a flammable gaseous mixture in the distributing chamber 5. This mixture passes through the wall 3 in the passageways formed by the openings 6, which sub-divide the mixture into many distinct fine streams of gas flowing into the burning chamber 1. The edges of the burning chamber are closed by an imperforate refractory ceramic wall or frame such as at 7 disposed between marginal portions of the perforated ceramic wall 3 and the screen 2.

The grid or screen 2 is made of a refractory metal withstanding temperatures at least as high as 1100° C., for example, of a nickel-chrome alloy. Use may be made, for example, of nickel-chromium wires 9 of approximately 1 mm. in diameter woven with a spacing from one to another of about 3 mm. to form mesh openings 8. A very thin screen is thus obtained which has, however, a thickness consistent with the necessary strength. The ratio of the screen area open to the flow of the burned gas, i.e., the total area of the openings 8, to the total screen area is great and in the case illustrated is greater than 0.5. In this way, not only does the screen provide large passageways for the escape of the burned gases, but it also lets through much of the radiation from the ceramic walls of the burning chamber 1. Being incandescent, moreover, the screen radiates both outwardly and inwardly, and its inward radiation raises the temperature of the ceramic walls of the burning chamber and thereby increases the outwards radiation of heat from those walls.

The burning chamber is quite shallow, being made with a depth of about 2 to 10 mm. The screen 2 thus is in position to be rendered incandescent by the heat from the flames leaving the openings 6 of the ceramic divider wall 3.

The openings 8 of the screen 2 have such a size that they permit the gaseous mixture to flow through them at a speed lower than the flame propagation speed. Therefore, in normal operaton, the burning always occurs inside the burning chamber. As happens with a Davy lamp, when the apparatus described is lighted, the burning first occurs outside the burning chamber 1. As soon, however, as the screen reaches the ignition temperature of the gas, a back-flash occurs and the burning settles in the burning chamber 1 due to the selection of the various dimensions which insure the correct ratios between the flow speeds of the gaseous mixture and the propagation speed of the flame.

Indeed, the openings 6 of the ceramic divider wall 3 have such a small area and are in such great number that the flow speed of the gaseous mixture through that wall is faster than the propagation speed of the flames. The thickness of the ceramic wall is, of couse, selected in relation to its thermal conductivity in such a way that the inner surface bounding the distributing chamber 5 will not reach a temperature high enough to cause ignition of the gaseous mixture in that chamber. Thus, the heat received by the ceramic wall surface of the burning chamber cannot escape through the ceramic wall but must accumulate on it to a high radiating intensity at that surface.

The apparatus according to the invention may be constructed in several different forms.

There has been shown in FIGS. 1 to 4 an apparatus having a flat perforated screen defining one side of a burning chamber 1 bordered on the other side by the ceramic wall 3 in the form of plate which also is flat though much thicker than the screen, and which has an area similar to that of the screen. The wall or plate 3 is arranged substantially parallel with the screen. The solid wall or walls 7 are formed by a frame of refractory ceramic material, which surround the working or perforated surface area of the ceramic wall 3 and projects beyond it with a height substantially equal to the depth of the burning chamber. The screen 2 lies freely on the outer surface of the frame 7 and is maintained thereon by a metal frame 10 which cooperates with the refractory frame 7 and is integrated with the burning chamber 1 through clamps 11 screwed in the cast frame or flange 12 which is integral with the imperforate walls of the distributing chamber 5.

The ceramic dividing wall 3 between the two chambers is made up of an assembly of small plates of refractory ceramic material, of the form indicated at 13. One of such small plates is shown in approximately full scale in FIG. 3, wherein the openings 6 are shown as being cylindrical. FIG. 4 shows in a like scale a small plate 13 the openings of which have the shape of slits.

FIGS. 5 and 6 relates to embodiments in which the distributing chamber 5 is in the center and is bounded by a perforated refractory ceramic wall similar to that which has been previously preferred to as the wall 3. So as to prevent any confusion, said wall will now be referred to as 14, the openings 6 being provided in some parts at least of said wall. The burning chamber 1 is formed, in this instance, between the wall 14 and the perforated grid or screen 2, the latter surrounding the wall in spaced relation to it so as to form a shallow annular burning chamber. The distributing and burning chambers in these forms may be cylindrical chambers which are coaxial and are limited by concentric parallel surfaces.

In FIG. 5, there is shown a cylindrical wall 14 in which are provided minute openings 6 which also are cylindrical and the axes of which are at right angles to the wall 14. At both ends of the walls 14 are provided spreadout parts or flanges 15 in one of which a sealed closing plug 16 is introduced, so as to suitably limit the distributing and burning chambers. The perforated screen 2 is cylindrical and is arranged, as in the case of FIGS. 1 to 4, so as to enable its free expansion. The screen 2 is not rigidly associated with the spread-out parts 15, but is movable with respect to the latter over about 3 to 4 mm. The screen is maintained in position by metal frames 17 which have the same purpose as the frame 10 of FIGS. 1 to 4.

An apparatus similar to the one shown in FIG. 5 may also be constructed in another way. Thus, in the apparatus of FIG. 6, the wall 14 is replaced by a stack of rings 18 made of a refractory ceramic material. So as to form the openings 6, grooves or hollows referred to in this case as 19, are provided in one of the end faces of each ring. When by stacking the plain face of one ring is placed against the face of the adjacent ring provided with the hollows 19, there are formed between the two rings the passageways 6 which may be similar to the slits shown in FIG. 4. The rings are held together between two flanges 20 made of refractory ceramic material, which replace the spreadout parts 15 of FIG. 5. The aggregate comprising the rings 18 and the flanges 20 is made rigid through assembly rods 21 provided with collars 22, which rods extend along the inner surfaces of the rings 18 and press the end faces of the rings together so as to prevent any lengthwise or crosswise movement thereof. It is to be noticed that the rods 21 with their collars 22 may be replaced by one or several assembly rods provided with fins and insuring similar purposes. Such stacked rings may form narrow slit openings at a determined spacing, which is very small and at the maximum about 0.7 mm., between two adjacent rings. This again enables a stack of the rings to form passageways having the same purpose as the openings 6.

It must be understood that the invention is not limited to the particular forms or embodiments described except as required by fair construction of the appended claims. Many changes may be made in the described embodiments without departing from the spirit or the scope of this invention.

The apparatus described may be supplied with low pressure fuel gas and thus may be operated by the use of town mains gas or of gas in bottles, such as bottled butane, each bottle being provided with a pressure-reducing valve.

I claim:

1. A gas-fired radiant heater comprising a gas distributing chamber, means for introducing into said chamber a flammable mixture of fuel gas and air, said chamber being bounded by a refractory ceramic wall of low thermal conductivity formed with a myriad of minute elongated passages therethrough for conducting from said chamber many distinct streams of said mixture to be burned in a myriad of minute flames at the outer side of said wall, said ceramic wall being sufficiently thick and formed of a ceramic material of sufficiently low thermal conductivity that it constitutes a means blocking within its own structure conductive dissipation of the flame heat reaching its outer surface and preventing its inner surface from reaching the ignition temperature of the mixture in said chamber and accumulating said heat at its outer surface until the resulting temperature rise dissipates said heat predominantly by radiation from said outer surface, said passages each being many times longer than they are wide and so narrow that flame will not back-propagate through them to said chamber, and a relatively thin heat-resistant grid spaced in front of said wall in position to be rendered incandescent by means from said flames and then to radiate heat outwardly from the heater and to obstruct the heat flow from said flames and said outer surface so as to intensify the heat accumulation, the temperature and the heat radiation of said outer surface, said grid being formed with a multiplicity of openings spaced apart over the flame area of said wall to pass freely to the front of the heater the burned gases and much of the radiation from said outer ceramic wall surface, whereby an extraordinarily large proportion of the heat of said flames is delivered from the heater as radiant heat.

2. A gas-fired radiant heater comprising a gas distributing chamber, means for continuously forming and introducing into said chamber a flammable mixture of fuel gas and ambient atmospheric air, said chamber being bounded by a refractory ceramic wall of low thermal conductivity formed with a myriad of minute elongated passages therethrough for conducting from said chamber many distinct streams of said mixture to be burned in a myriad of minute flames at the outer side of said wall, said ceramic wall being sufficiently thick and formed of a ceramic material of sufficiently low thermal conductivity that it constitutes a means blocking within its own structure conductive dissipation of the flame heat reaching its outer surface and preventing its inner surface from reaching the ignition temperature of the mixture in said chamber and accumulating said heat at its outer surface until the resulting temperature rise dissipates said heat predominantly by radiation from said outer surface, said passages each being many times longer than they are wide and so narrow that flame will not back-propagate through them to said chamber, and a relatively thin coarse heat-resistant grid spaced in front of said wall in position to be rendered incandenscent by heat from said flames and then to radiate heat outwardly from the heater and to obstruct the heat flow from said flames and said outer surface so as to intensify the heat accumulation, the temperature and the heat radiation of said outer surface, said grid being formed with a multiplicity of openings spaced apart over the flame area of said wall to pass freely to the front of the heater the burned gases and much of the radiation from said outer ceramic wall surface, the thickness of said grid being not greater than approximately 3 mm. and said ceramic wall being at least several times greater in thickness than said grid, whereby an extraordinarily large proportion of the heat of said flames is delivered from the heater as radiant heat.

3. A gas-fired radiant heater comprising a gas distributing chamber, means for continuously forming and introducing into said chamber a flammable mixture of fuel gas and ambient atmospheric air, said chamber being bounded by a refractory ceramic wall of low thermal conductivity formed with a myriad of minute elongated tubular passages therethrough for conducting from said chamber many distinct streams of said mixture to be burned in a myriad of minute flames at the outer side of said wall, said ceramic wall being sufficiently thick and formed of a ceramic material of sufficiently low thermal conductivity that it constitutes a means blocking within its own structure conductive dissipation of the flame heat reaching its outer surface and preventing its inner surface from reaching the ignition temperature of the mixture in said chamber and accumulating said heat at its outer surface until the resulting temperature rise dissipates said heat predominantly by radiation from said outer surface, said passages each being many times longer than they are wide and so narrow that flame will not back-propagate through them to said chamber, and a relatively thin heat-resistant grid spaced in front of and substantially parallel to said wall in position to be rendered incandescent by heat from said flames and forming with said ceramic wall a heat-accumulating reverberatory burning chamber within which heat is cross-radiated between said grid and said outer ceramic wall surface to intensify the temperature and the radiation of said outer surface, said grid being formed with a multiplicity of openings spaced apart over the flame area of said wall to pass freely to the front of the heater the burned gases and intensified radiation from said outer ceramic wall surface, whereby an extraordinarily large proportion of the heat of said flames is delivered from the heater as radiant heat.

4. A gas-fired radiant heater comprising a gas distributing chamber, means for continuously forming and introducing into said chamber a flammable mixture of fuel gas and ambient atmospheric air, said chamber being bounded by a refractory ceramic wall of low thermal conductivity formed with a myriad of minute elongated tubular passages therethrough for conducting from said chamber many distinct streams of said mixture to be burned in a myriad of minute flames at the outer side of said wall, said ceramic wall being sufficiently thick and formed of a ceramic material of sufficiently low thermal conductivity that it constitutes a means blocking within its own structure conductive dissipation of the flame heat reaching its outer surface and preventing its inner surface from reaching the ignition temperature of the mixture in said chamber and accumulating said heat at its outer surface until the resulting temperature rise dissipates said heat predominantly by radiation from said outer surface, and a relatively thin coarse heat-resistant grid spaced in front of and substantially parallel to said wall in position to be rendered incandenscent by heat from said flames and forming with said ceramic wall a heat-accumulating reverberatory burning chamber within which heat is cross-radiated between said grid and said outer ceramic wall surface to intensify the temperature and the radiation of said outer surface, said grid being formed with a multiplicity of openings spaced apart over the flame area of said wall to pass freely to the front of the heater the burned gases and intensified radiation from said outer ceramic wall surface, said passages each being many times longer than they are wide and sufficiently narrow to prevent flame from back-propagating in them through said ceramic wall, said grid comprising openings sufficiently large that a flame formed by ignition of said mixture outside said grid will back-propagate through said grid to settle in said burning chamber, whereby an extraordinarily large proportion of the heat of said flames is delivered from the heater as radiant heat.

5. A radiant heater as claimed in claim 1, said grid being spaced from said ceramic wall by a distance of not more than about 10 mm.

6. A radiant heater as claimed in claim 1, said grid being a screen of nickel-chromium alloy wire of approximately 1 mm. in diameter woven to mesh openings of approximately 3 mm. in width.

7. A gas-fired radiant heater comprising a gas distributing chamber, means for continuously forming and introducing into said chamber a flammable mixture of fuel gas and ambient atmospheric air, said chamber being bounded at one side by a substantially flat refractory ceramic wall of low thermal conductivity formed with a myriad of minute elongated tubular passages therethrough for conducting from said chamber many distinct streams of said mixture to be burned in a myriad of minute flames at the outer side of said wall, said wall being sufficiently thick and formed of a refractory ceramic material of sufficiently low thermal conductivity that it constitutes a means blocking within its own structure conductive dissipation of the flame heat reaching its outer surface and preventing its inner surface from reaching the ignition temperature of the mixture in said chamber and accumulating said heat at its outer surface until the resulting temperature rise dissipates said heat predominantly by radiation from said outer surface, and a relatively thin substantially flat screen of heat-resistant metal spaced in front of said wall by a distance of not more than about 10 mm. in position to become incandescent under heat from said flames and then to radiate heat outwardly from the heater and to obstruct the heat flow from said flames and said outer surface so as to intensify the heat accumulation, the temperature and the heat radiation of said outer wall surface, said screen being formed with openings regularly spaced apart over its working area and spaced apart over the flame area of said wall to pass freely to the front of the heater the burned gases and much of the radiation from said outer surface, said passages each being many times longer than they are wide and sufficiently narrow to prevent flame from back-propagating in them through said wall, said screen openings being at least several times fewer in number and at least several times larger in width than said tubular passages, whereby an extraordinarily large proportion of the heat of said flames is delivered from the heater as radiant heat.

8. In a radiant heater as claimed in claim 7, a refractory frame bordering said wall between the latter and said screen, said frame providing rim surfaces spaced from said outer surface for supporting marginal portions of said screen, and means holding said marginal portions on said rim surfaces for free expansion thereover in the plane of said screen.

9. A gas-fired radiant heater comprising a gas distributing chamber, means for continuously forming and introducing into said chamber a flammable mixture of fuel gas and ambient atmospheric air, said chamber being bounded by a refractory ceramic wall of low thermal conductivity formed with a myriad of minute elongated tubular passages extending therethrough normal thereto for conducting from said chamber many distinct streams of said mixture to be burned in a myriad of minute flames at the outer side of said wall, said wall being sufficiently thick and formed of a ceramic material of sufficiently low thermal conductivity that it constitutes a means blocking within its own structure conductive dissipation of the flame heat reaching its outer surface and preventing its inner surface from reaching the ignition temperature of the mixture in said chamber and accumulating said heat at its outer surface until the resulting temperature rise dissipates said heat predominantly by radiation from said outer surface, said passages each being many times longer than they are wide and so narrow that flame will not back-propagate through them to said chamber, and a relatively thin heat-resistant metal screen spaced in front of and substantially parallel to said wall at a distance of not more than about 10 mm. therefrom in position to be rendered incandescent by heat from said flames, said screen being operative to radiate heat outwardly from the heater and to obstruct the heat flow from said flames and said outer surface so as to intensify the heat accumulation, the temperature and the radiation of said outer surface, said screen having a thickness of approximately 2 mm. and being formed with a multiplicity of openings of approximately 3 mm. in width spaced apart regularly over the flame area of said wall, and the thickness of said ceramic wall being several times greater than that of said screen, whereby, by the intensified radiation of said outer surfaces passing through the screen openings and the outward radiation of said screen, an extraordinarily large proportion of the heat of said flames is delivered from the heater as radiant heat.

References Cited in the file of this patent

UNITED STATES PATENTS

| 283,020 | Popp | Aug. 14, 1883 |
| 1,259,029 | Lucke | Mar. 12, 1918 |
| 1,302,819 | Lucke | May 6, 1919 |
| 1,506,964 | Antrim | Sept. 2, 1924 |
| 2,775,294 | Schwank | Dec. 25, 1956 |

FOREIGN PATENTS

| 5,068 | Great Britain | of 1906 |
| 494,087 | Great Britain | Oct. 17, 1938 |
| 325,568 | Great Britain | Feb. 20, 1930 |

UNITED STATES PATENT OFFICE
CERTIFICATE OF CORRECTION

Patent No. 3,107,720                          October 22, 1963

Jean van Swinderen

It is hereby certified that error appears in the above numbered patent requiring correction and that the said Letters Patent should read as corrected below.

Column 5, line 41, for "means" read -- heat --; line 74, for "incandenscent" read -- incandescent --; column 6, line 67, for "incandencent" read -- incandescent --; column 8, line 40, for "surfaces" read -- surface --.

Signed and sealed this 28th day of April 1964.

(SEAL)
Attest:
ERNEST W. SWIDER

Attesting Officer

EDWARD J. BRENNER
Commissioner of Patents